(12) United States Patent
Colwell

(10) Patent No.: US 12,481,746 B1
(45) Date of Patent: Nov. 25, 2025

(54) GOVERNANCE SYSTEM

(71) Applicant: Brian Colwell, Surprise, AZ (US)

(72) Inventor: Brian Colwell, Surprise, AZ (US)

( * ) Notice: Subject to any disclaimer, the term of this patent is extended or adjusted under 35 U.S.C. 154(b) by 22 days.

(21) Appl. No.: 18/788,293

(22) Filed: Jul. 30, 2024

(51) Int. Cl.
  *G06F 21/00* (2013.01)
  *G06F 21/33* (2013.01)

(52) U.S. Cl.
  CPC .................... *G06F 21/33* (2013.01)

(58) Field of Classification Search
  None
  See application file for complete search history.

(56) References Cited

U.S. PATENT DOCUMENTS

| | | | | |
|---|---|---|---|---|
| 12,423,676 | B1* | 9/2025 | Brooks | G06Q 20/363 |
| 12,430,463 | B1* | 9/2025 | Witchey | H04L 9/008 |
| 12,444,150 | B2* | 10/2025 | Witchey | G06T 19/006 |
| 2022/0366022 | A1* | 11/2022 | Goldston | G06F 16/61 |
| 2024/0428323 | A1* | 12/2024 | Ramde | G06Q 20/382 |
| 2025/0028790 | A1* | 1/2025 | Finlow-Bates | G06F 21/1014 |
| 2025/0029137 | A1* | 1/2025 | Ramde | G06Q 20/3829 |
| 2025/0077625 | A1* | 3/2025 | Coleman | G06F 16/23 |
| 2025/0158819 | A1* | 5/2025 | Guy | H04L 9/50 |
| 2025/0166464 | A1* | 5/2025 | Keilwert | G07F 17/3255 |
| 2025/0225505 | A1* | 7/2025 | Andon | G06Q 20/02 |
| 2025/0317302 | A1* | 10/2025 | Witoff | H04L 9/3247 |

OTHER PUBLICATIONS

Shao, Xiang et al. Non-Fungible Token Enabled Spectrum Sharing for 6G Wireless Networks. 2023 IEEE Globecom Workshops (GC Wkshps). https://ieeexplore.ieee.org/stamp/stamp.jsp?tp=&arnumber=10464620 (Year: 2024).*

Bandara, Eranga et al. SliceGPT—OpenAI GPT-3.5 LLM, Blockchain and Non-Fungible Token Enabled Intelligent 5G/6G Network Slice Broker and Marketplace. 2024 IEEE 21st Consumer Communications & Networking Conference (CCNC). https://ieeexplore.ieee.org/stamp/stamp.jsp?tp=&arnumber=10454701 (Year: 2024).*

Manzoor, Ahsan et al. Scavenger Hunt: Utilization of Blockchain and IoT for a Location-Based Game. IEEE Access, vol. 8. https://ieeexplore.ieee.org/stamp/stamp.jsp?tp=&arnumber=9253568 (Year: 2020).*

* cited by examiner

*Primary Examiner* — Jeremiah L Avery

(74) *Attorney, Agent, or Firm* — Bruce A. Lev

(57) ABSTRACT

An improved governance system incorporating Web 3 technology, which includes blockchain technologies, decentralized communities, provable identity via NFTs (Non-Fungible Tokens), and token based economics.

8 Claims, 16 Drawing Sheets

GOVERNANCE SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to governance systems, and more specifically to governance systems incorporating blockchain technologies, decentralized communities, provable identity via NFT (Non-Fungible Tokens), and token based economics.

2. Description of the Related Art

Prior art and modern systems of governance have become overly centralized and fail to safeguard personal freedoms, individualism, and principles modern nation states are built upon and rely on to survive.

The status quo undermines civil liberties and stifles innovation, while its territoriality limits accountability and promotes conflict. Recent technological advances and a gradual shift in public consciousness have given rise to an alternative—embracing Web 3 technology, which includes blockchain technology, decentralized communities, provable identity via NFTs (Non-Fungible Tokens), and token based economics. A need for an advanced governance system is important in regaining our self-sovereignty.

BRIEF SUMMARY OF THE INVENTION

In view of the foregoing disadvantages inherent in the known types of governance systems or the like in the prior art, the present invention provides a new and improved governance system incorporating blockchain technologies, decentralized communities, provable identity via NFTs (Non-Fungible Tokens), and token based economics, with all the advantages of the prior art and none of the disadvantages.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

Figure 1:
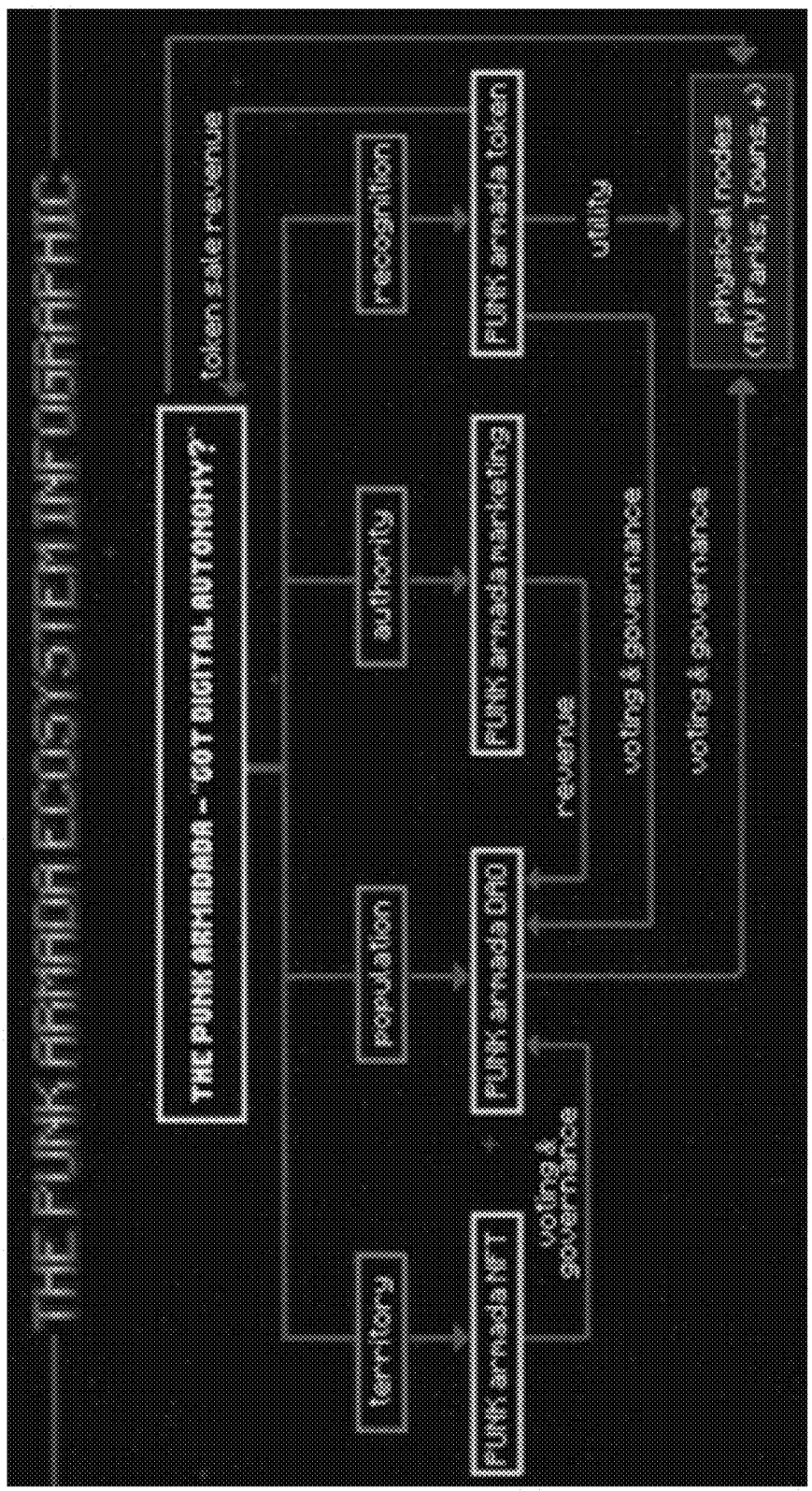
FIG. 1 shows the PUNK Armada Ecosystem.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

As discussed previously, the improved governance system incorporates Web 3 technology that includes blockchain technologies, decentralized communities, provable identity via NFTs (Non-Fungible Tokens), and token based economics.

A PUNK Armada NFT (Non-Fungible Token) serves as the governance token of the PUNK Armada DAO (Decentralized Autonomous Organization). PUN K Armada NFTs are owned by individuals and offer voting powers. The more NFTs an individual has, the stronger his/her voting power becomes. Real time validation checks are used to ensure voting compliance and maintain integrity and fairness of the voting process. These validation checks are performed to ensure that the PUNK Armada NFTs are not listed for sale at the moment of voting and at the closing of the vote, and that only active, non-listed PUNK Armada NFTs contribute to an individual's voting impact.

The backend of the system will verify through each marketplace's API (Application Programming Interface) that the PUNK Armada NFTs used for voting are not currently listed. The backend verifies an individual's signature, checks the individual's existence, requests JWT tokens (JSON Web Tokens), stores JWT tokens, and can generate JWT tokens.

Soft staking, also known as "liquid staking", allows PUNK Armada DAO individuals to prove ownership of PUNK Armada NFTs without locking them from potential appreciation or trade and is required in order to participate in DOA governance. NFT Soft Staking is a concept within blockchain and decentralized finance (DeFi) that require users to hold their NFTs (Non-Fungible Tokens) to incentivize holders to retain ownership of their NFTs by offering rewards, such as governance power, staking rewards, or other benefits.

The following is how NFT Soft Staking is applied in the PUNK Armada DAO. The PUNK Armada DAO system leverages the concept of NFT soft staking to enhance its voting and governance mechanisms.

1. Voting Power and NFT Ownership:
    Each NFT owned by a member of the DAO provides additional voting power. The more NFTs a user owns, the stronger their vote.
    This creates an incentive for users to hold and not sell their NFTs, as each NFT contributes to their influence within the DAO.
2. Soft Stake Validation:
    The system performs validation checks to ensure that NFTs used for voting are not listed for sale. This ensures that only NFTs actively held by users contribute to voting power.
    These checks are conducted at the moment of voting and again at the closure of the voting period to maintain the integrity of the vote.
3. Submission Process:
    When a user votes, they select the NFTs they wish to use. Only NFTs that are not listed for sale (soft staked) are considered valid for voting.
    This selection process is facilitated through the user interface, where users can choose their NFTs and submit their votes.
4. Real-Time Validation and Compliance:
    During the voting process, the system checks the listing status of NFTs in real-time. This ensures that any NFTs listed for sale are excluded from the voting process.
    At the end of the voting period, a cron job validates the soft staking status of all NFTs used in the vote. This ensures compliance and prevents any manipulation of voting power.
5. Penalties for Misuse:
    Users who vote with an NFT and later list it for sale during the voting period face penalties. This discourages misuse and ensures the integrity of the voting process.
    Penalties can range from warnings to being invalidated from voting for a specified period.

Technical Implementation:
1. Database and Schema:
    The system's database schema includes models for User Account, NFT, Proposal, Vote, and User Penalty.
    Each User Account is associated with a list of NFTs (nfts), votes (votes), and proposals (proposals). The NFT model includes fields for token ID and wallet Address, ensuring that each NFT is uniquely identified and linked to a user.
2. NFT Validation Service:
    An NftService is implemented to interact with the Reservoir API. This service checks whether NFTs are listed for sale and retrieves user tokens.
    The service is used during the voting process to validate NFTs in real-time and at the closure of the voting period.
3. Voting Process:
    Users initiate the voting process by selecting the NFTs they wish to use. The frontend sends a request to the backend with the selected NFTs.
    The backend validates the NFTs using the NftService, ensuring they are not listed for sale.
    Validated votes are stored in the database, and a cron job is scheduled to run at the proposal's closing date.
4. Cron Job Execution:
    At the proposal's closing date, the cron job retrieves all votes and performs a final validation of the NFTs.
    The system calculates the final decision based on validated votes and updates the proposal status and results.

NFT soft staking in the PUNK Armada DAO system ensures a fair and transparent voting process by leveraging the concept of locking NFTs without transferring them. This mechanism incentivizes users to retain ownership of their NFTs, thus enhancing their governance power within the DAO. The technical implementation, including real-time validation and cron job execution, ensures the integrity and compliance of the voting process, making the system robust and trustworthy.

UI development for the platform will clearly inform users about the voting rules through "soft staking," ensuring transparency and community acceptance. Upon registering with the DAO and engaging in voting, users will be prompted to agree to these terms and conditions. UI stands for "user interface".

When voting, members select which of their PUNK Armada NFTs to use for voting. Only unlisted NFTs are considered valid for the vote.

The impact of an individual's vote is determined by the number of PUNK Armada NFTs used in the vote. For example, voting with 5 NFTs yields a voting power of 5. Additionally it is possible for the same PUNK Armada NFT to be utilized in voting on multiple proposals, provided all guidelines are strictly adhered to.

The penalty system of the PUNK Armada DAO is designed to maintain order and fairness, and to support loyalty and community sentiment. As such, smart contracts automatically enforce rules and penalties if predefined conditions are violated. All penalties are recorded on the blockchain, providing a transparent record of why and how penalties were imposed. Smart contracts utilized in the PUNK Armada DAO will show that a transfer was made and this will show in the reservoir API. Listing on an exchange—this is what reveals a penalty, and this is stored in the blockchain.

There are currently only two "bad behaviors" that the PUNK Armada DAO platform considers as predefined conditions for the application of swift justice:
    First, voting with an NFT and then later listing it at some point during the voting period. Members who vote with a PUNK Armada NFT and later list it during the voting period will face penalties for misuse;
    Secondly, voting with an NFT and then later transferring it at some point during the voting period. Members who vote with a PUNK Armada NFT and later transfer it during the voting period will face penalties for misuse.

The Penalties For "Bad Behavior" In The PUNK Armada DAO are as follows:

First Offense—Warning;
Second Offense—Warning;
Third Offense—Invalidation from voting for a period to be determined—
Vote invalidation and disabled login to the PUNK Armada DAO DAPP.

In general, the steps for voting include initiating a vote; selecting NFT's for voting; creating a proposal for voting; and using backend processing to validate, create, and finalize the proposal.

The PUNK Armada DAO authentication process includes:

Step 1—Member Initiates Login—
The user attempts to log in using their Ethereum wallet. This process starts from the frontend application, which prompts the user to sign a unique message using their wallet.

Step 2—Message Signing—
The frontend generates a unique nonce (a random string) and asks the user to sign it using their private key. This signed message is then sent to the backend for verification.

Step 3—Backend Verification—
The backend, built with NestJS, uses Passport.js with a custom Web3 strategy to verify the signed message. The backend extracts the wallet address from the signed message, validates the signature using Ethers.js to ensure it matches the generated nonce, and checks if the wallet address exists in the database. If not, a new user record is created.

Step 4—Token Generation—
Upon successful verification, the backend generates a JWT (JSON Web Token) containing the user's wallet address and other relevant information. This token is sent back to the frontend.

Step 5—Secure Session Management—
The frontend stores the JWT, typically in local storage or cookies, to manage the user's session. This token is used for authenticated requests to the backend, ensuring secure access to protected resources. This process ensures that only the rightful owner of an Ethereum wallet can log in, leveraging the security properties of blockchain and cryptographic signatures.

There are thirteen steps in the PUNK Armada DAO authentication process:

Step 1—User initiates login—
The user begins the login process in the application;
Step 2—Frontend generates a nonce—
The frontend generates a unique nonce to be used for authentication;
Step 3—User signs the nonce with their Ethereum wallet—
The user uses their Ethereum wallet to sign the generated nonce;
Step 4—Frontend sends the signed message and wallet address to the backend—
The frontend sends the signed message and the user's wallet address to the backend for verification;
Step 5—Backend verifies the signature—
The backend verifies the authenticity of the signed message using the wallet address;
Step 6—Backend checks if the user exists in the database—
The backend checks if the user's wallet address already exists in the database;
Step 7—If the user does not exist, the backend creates a new user—
If the user does not exist, the backend creates a new user record in the database;
Step 8—Backend requests user tokens from the Reservoir API—
The backend makes a request to the Reservoir API to obtain tokens associated with the user's wallet address;
Step 9—The Reservoir API responds with the user's tokens—
The Reservoir API responds with the user's tokens;
Step 10—Backend stores the user's tokens in the database—
The backend stores the user's tokens in the database, associating them with the user's record;
Step 11—Backend generates a JWT token—
The backend generates a JWT (JSON Web Token) for the user's session;
Step 12—Backend sends the JWT token to the frontend—
The backend sends the generated JWT token to the frontend;
Step 13—Frontend stores the JWT token—
The frontend stores the JWT token to maintain the user's session;

PUNK Armada DAO authentication process:
User—
Initiates the login process and signs the nonce;
Frontend—
Generates the nonce, sends the signed message, and stores the JWT token;
Backend—
Verifies the signature, checks the user's existence, creates the user if necessary, requests tokens, stores tokens, and generates the JWT token;
Database—
Stores user information and tokens obtained from the Reservoir API; and
Reservoir API—
Provides the user's tokens in response to the backend's request;

There are eight steps in the PUNK Armada DAO proposal list fetching process:

Step 1—User initiates a request to view proposals—
The user begins the process to view the list of proposals;
Step 2—Frontend sends a request to the backend—
The frontend sends a request to the backend to fetch the list of proposals including a filter for status (IN PROGRESS or CLOSED);
Step 3—Backend receives the request—
The backend receives the request to fetch proposals with the specified status filter;
Step 4—Backend queries the database for proposals—
The backend queries the database to retrieve the list of proposals that match the specified status:
Step 5—Database responds with proposals—
The database sends the list of proposals back to the backend;
Step 6—Backend formats the proposals—
The backend formats the retrieved proposals, possibly adding additional data or metadata;
Step 7—Backend sends the formatted proposals to the frontend—
The backend sends the list of formatted proposals to the frontend;

Step 8—Frontend receives and displays the proposals—
The frontend receives the list of proposals and displays them to the user.
Fetching PUNK Armada DAO elements of the DAO proposal list fetching process:
User—
Initiates the request to view the list of proposals;
Frontend—
Sends the request to the backend with the status filter and displays the proposals received;
Backend—
Receives the request, queries the database with the status filter, formats the proposals, and sends them back to the frontend;
Database—
Stores and retrieves proposal information as requested by the backend, filtering by status (IN PROGRESS or CLOSED)
There are eight steps in the PUNK Armada DAO user NFT fetching process:
Step 1—User initiates a request to view their NFTs—
The user begins the process to view the list of their NFTs;
Step 2—Frontend sends a request to the backend—
The frontend sends a request to the backend to fetch the user's NFTs;
Step 3—Backend receives the request—
The backend receives the request to fetch the user's NFTs;
Step 4—Backend queries the database for user's NFTs—
The backend queries the database to retrieve the NFTs associated with the user's wallet address;
Step 5—Database responds with user's NFTs—
The database sends the list of NFTs owned by the user back to the backend:
Step 6—Backend processes and formats the NFT data—
The backend processes and formats the NFT data received from the database;
Step 7—Backend sends the formatted NFT data to the frontend—
The backend sends the list of formatted NFTs to the frontend; and
Step 8—Frontend receives and displays the NFTs—
The frontend receives the list of NFTs and displays them to the user.
Elements of the DAO user NFT fetching process:
User—
Initiates the request to view their NFTs;
Frontend—
Sends the request to the backend and displays the NFTs received:
Backend—
Receives the request, queries the database, processes the NFT data, and sends it back to the frontend; and
Database—
Stores and retrieves the user's NFTs as requested by the backend.
There are eight steps in the PUNK Armada DAO "fetching members" process:
Step 1—User initiates a request to view the members list—
The user begins the process to view the list of members;
Step 2—Frontend sends a request to the backend—
The frontend sends a request to the backend to fetch the list of members;
Step 3—Backend receives the request—
The backend receives the request to fetch the members list;
Step 4—Backend queries the database for non-banned members—
The backend queries the database to retrieve the members who are not banned;
Step 5—Database responds with non-banned members—
The database sends the list of non-banned members back to the backend;
Step 6—Backend processes and formats the members data—
The backend processes and formats the members data received from the database;
Step 7—Backend sends the formatted members data to the frontend—
The backend sends the list of formatted non-banned members to the frontend; and
Step 8—Frontend receives and displays the members—
The frontend receives the list of non-banned members and displays them to the user;
Elements of the DAO "fetching members" process:
User—Initiates the request to view the list of members;
Frontend—
Sends the request to the backend and displays the members received;
Backend—
Receives the request, queries the database, processes the members data, and send it back to the frontend; and
Database—
Stores and retrieves member information, ensuring only non-banned members are retrieved as requested by the backend.
There are twelve steps in the PUNK Armada DAO proposal creation process:
Step 1—Admin user initiates the request to create a proposal—
The admin user begins the process to create a new proposal;
Step 2—Frontend sends the proposal creation request to the backend—
The frontend sends the proposal details to the backend;
Step 3—Backend receives the request—
The backend receives the request to create a new proposal;
Step 4—Backend checks if the user is an admin—
The backend verifies if the user has admin privileges;
Step 5—If the user is not an admin—
The backend returns an error indicating that the user does not have the necessary permissions to create a proposal. Error response then sent to frontend—the frontend displays an error message to the user;
Step 6—If the user is an admin—
The backend proceeds to create the proposal;
Step 7—Backend saves the proposal to the database—
The backend saves the new proposal details to the database;
Step 8—Backend schedules a cron job for the proposal—
The backend schedules a cron job to run until the proposal's closing date;
Step 9—Database stores the proposal—
The proposal details are stored in the database;
Step 10—Cron job is scheduled—
The cron job is set to monitor and manage the proposal until its closing date;
Step 11—Backend sends a success response to the frontend—
The backend sends confirmation that the proposal has been successfully created;

Step 12—Frontend receives and displays the success message—
The frontend shows a success message to the user indicating that the proposal has been created;
Elements of the DAO proposal creation process:
Admin User—
Initiates the proposal creation process;
Frontend—
Sends the proposal creation request to the backend and displays the result;
Backend—
Receives the request, checks if the user is an admin, creates the proposal if the use r is an admin, schedules the cron job, and sends a response back to the frontend;
Database—
Stores the proposal information; and
Cron Job Scheduler—
Schedules and manages the cron job to run until the proposal's closing date.
There are nine steps in the PUNK Armada DAO proposal closure process:
Step 1—Admin creates a proposal—
The admin user creates a new proposal, and the proposal details are saved in the database:
Step 2—Backend schedules a cron job—
A cron job is scheduled to run at the proposal's closing date;
Step 3—Cron job is triggered on the proposal's closing date—
The cron job is activated when the proposal's closing date is reached;
Step 4—Cron job retrieves the proposal and votes—
The cron job retrieves the proposal details and all associated votes from the data base;
Step 5—Cron job validates the soft staking of NFTs—
For each vote, the cron job verifies if the NFTs used in the vote are not listed for sale (soft staked) at the moment of vote closing;
Step 6—Cron job calculates the final decision—
Based on the validated votes, the cron job calculates the final decision of the proposal;
Step 7—Cron job updates the proposal status—
The proposal status is updated in the database to reflect the final decision (e.g., APPROVED, REJECTED);
Step 8—Cron job stores the final results—
The final results and any relevant data are stored in the database; and
Step 9—Notification to admin and participants—Optional—
Notifications are sent to the admin and participants about the final decision.
Elements of the DAO proposal closure process:
Admin User—
Creates a new proposal;
Backend—
Schedules the cron job upon proposal creation;
Database—
Stores proposal details, votes, and final results;
Cron Job Scheduler—
Schedules and triggers the cron job at the proposal's closing date;
Cron Job Execution—
Retrieves the proposal and votes from the database, validates the soft staking of NFTs for each vote, calculates the final decision based on the validated votes, updates the proposal status in the database, and then stores the final results in the database; and
Notification System (optional)—
Sends notifications to the admin and participants about the final decision.

Referring to the flowchart in FIG. 1, the present invention discloses a PUNK Armada Ecosystem including a PUNK Armada Network State, which is a decentralized social network having a capacity for collective action, an integrated cryptocurrency, and a consensual government limited by smart contracts, in which identity and communications flow directly between individuals.

The tools of the PUNK Armada Network State, collectively referred to as the "PUNK Armada Ecosystem", are precisely designed to enable the PUNK Armada's Network >State organization. Planned as essential Web3 infrastructure for establishing digital and then physical self-sovereignty, the PUNK Armada Ecosystem includes the following tools:

1 Leverage the territory of our NFT collection;
2 Leverage the population of our community;
3 Leverage the authority of our agency; and
4 Leverage the recognition of our cryptocurrency.

The PUNK Armada Ecosystem Flowchart shows The PUNK Armada NFT and the PUNK Armada Token as having voting and governance rights within the PUNK Armada DAO for the purpose of establishing and participating in the PUNK Armada Network State. See flowchart FIG. 1.

Figure 2:
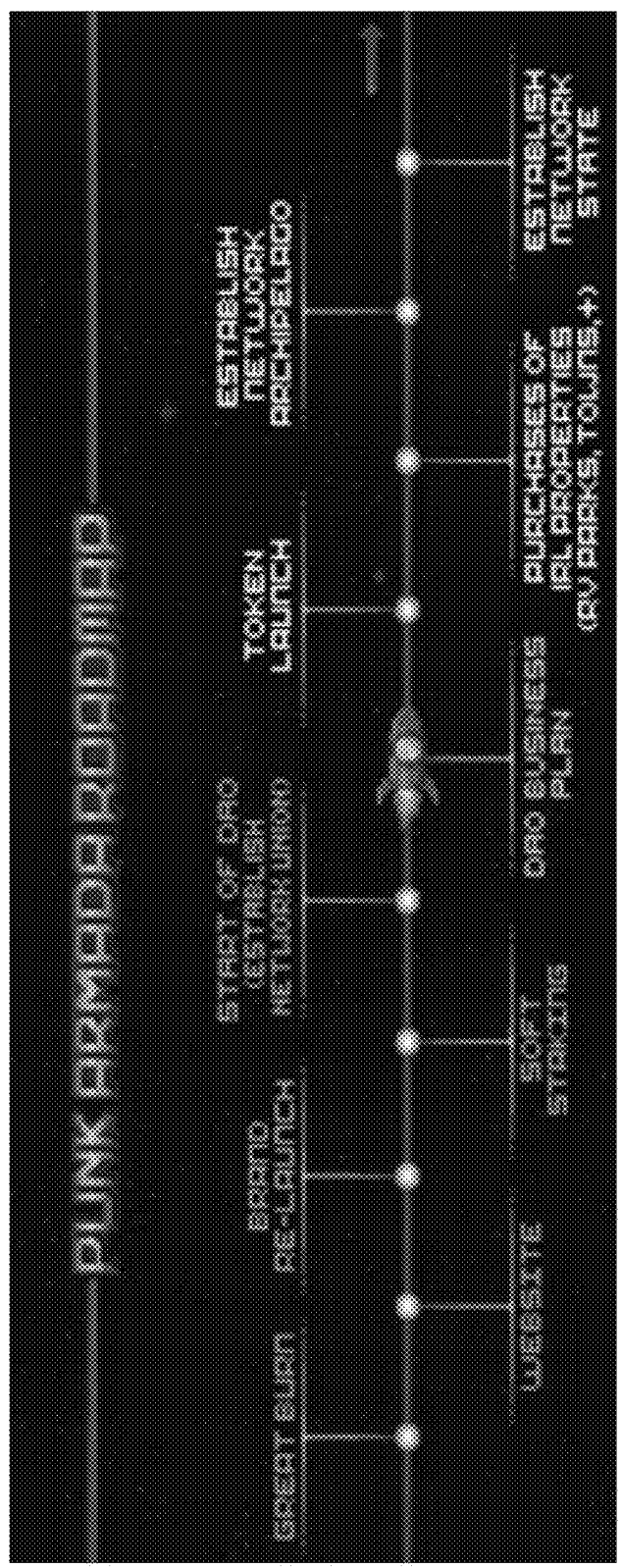
FIG. 2 shows the PUNK Armada Roadmap.

Referring to the flowchart in FIG. 2, the PUNK Armada Roadmap shows that the PUNK Armada is currently in the "Network Union" phase of developing the PUNK Armada Network State. The following step is to develop the PUNK Armada business plan, the token launch, and establishing the PUNK Armada "Network Archipelago".

Figure 3:
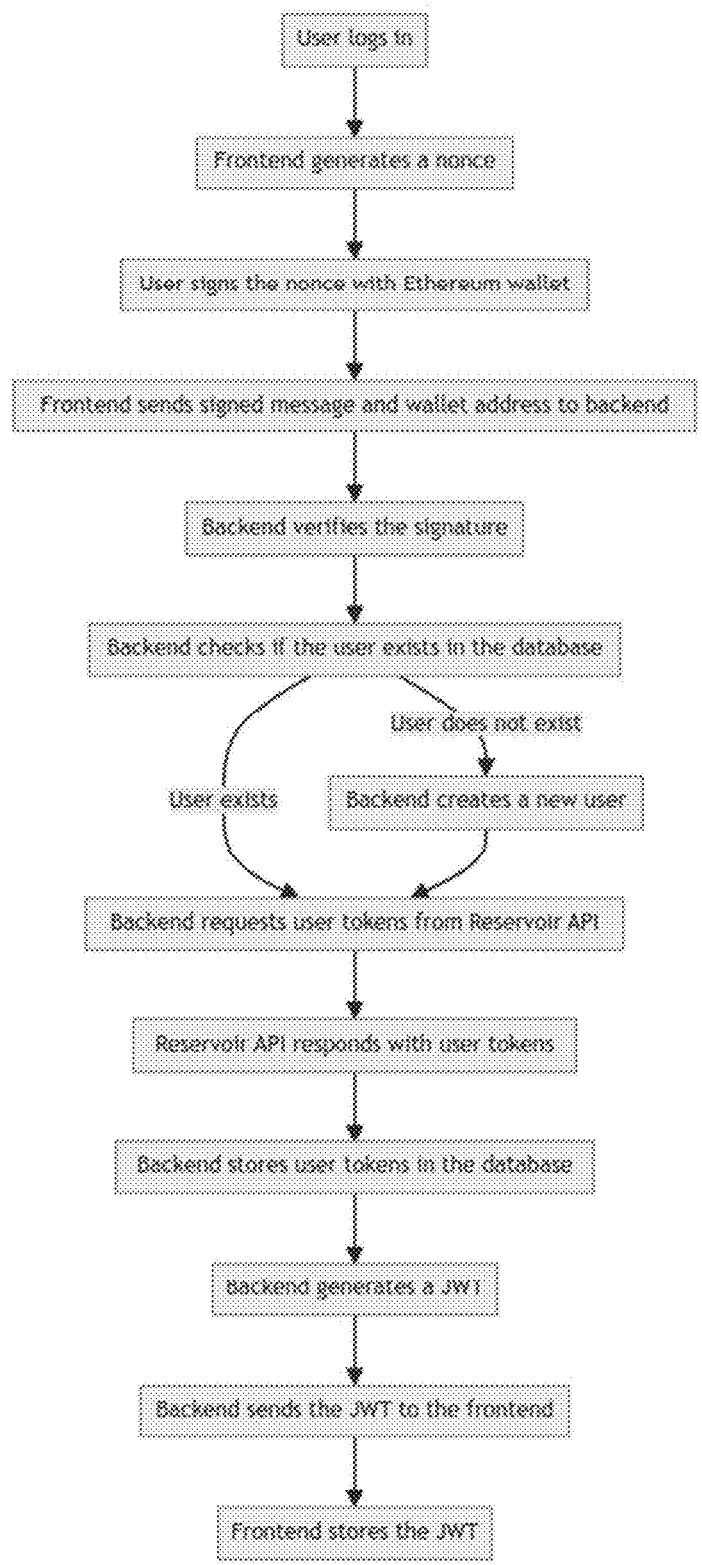
FIG. 3 shows a member/user's list flowchart.
Figure 4:
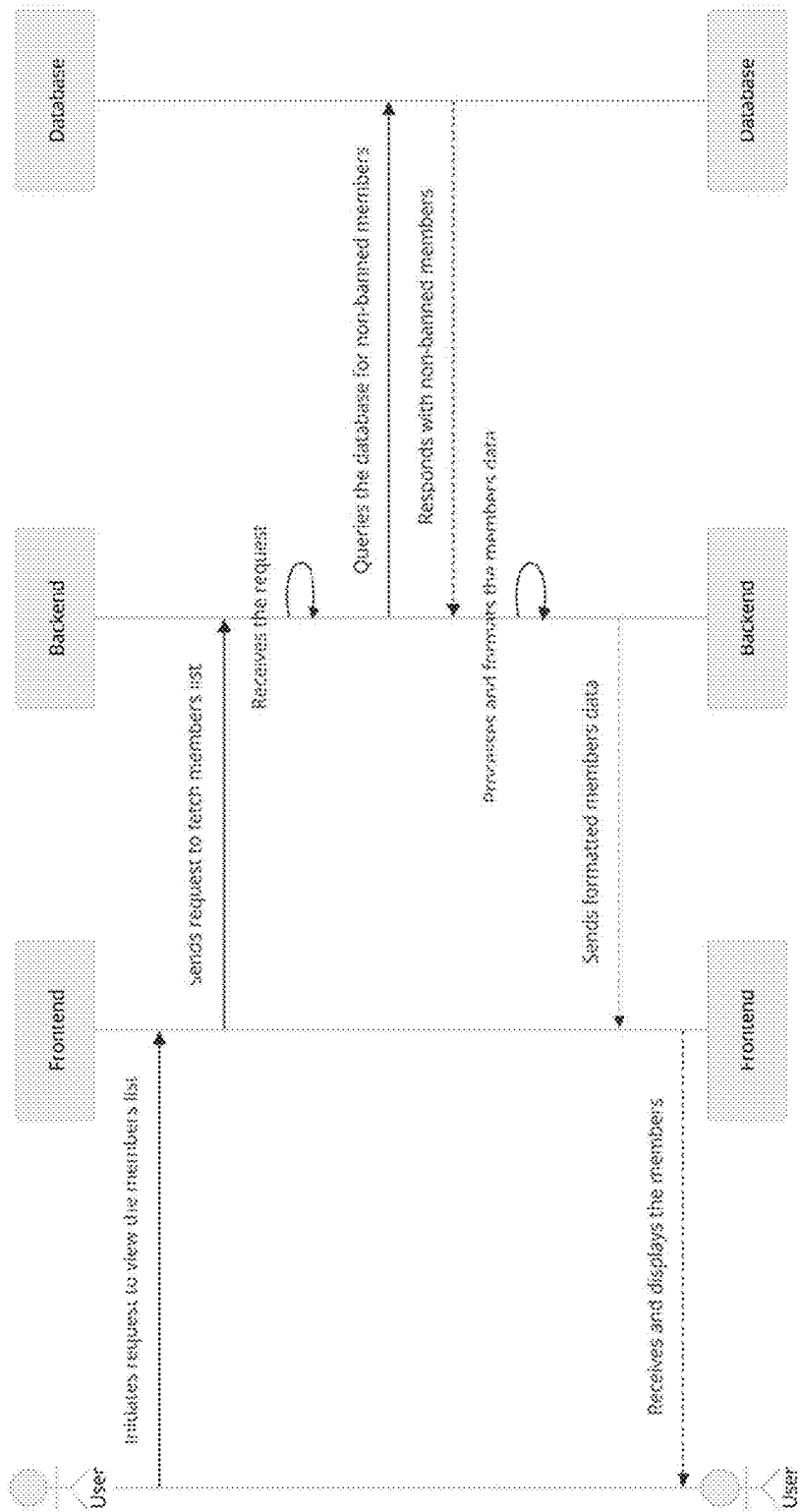
FIG. 4 shows a member/user's list sequence.
Figure 5:
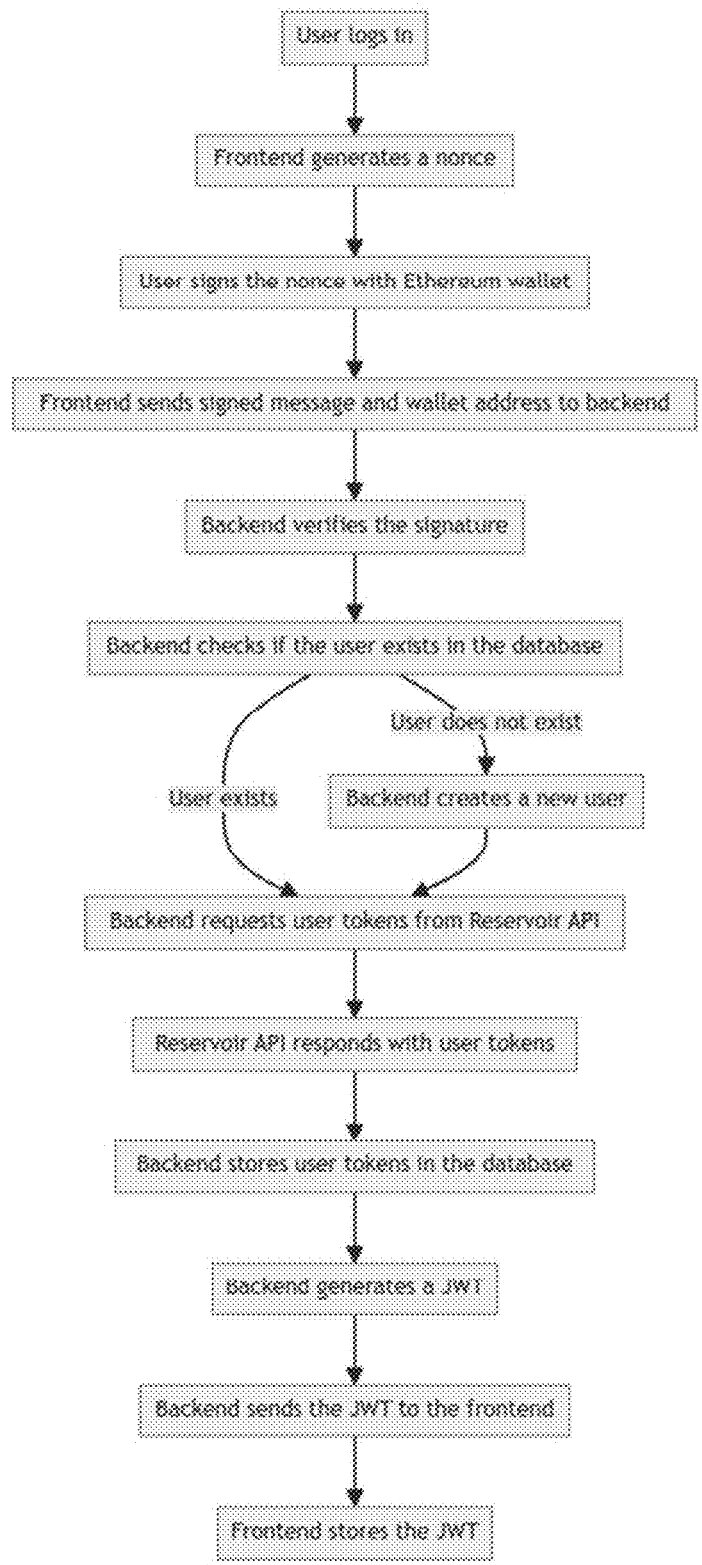
FIG. 5 shows a login flowchart.
Figure 6:
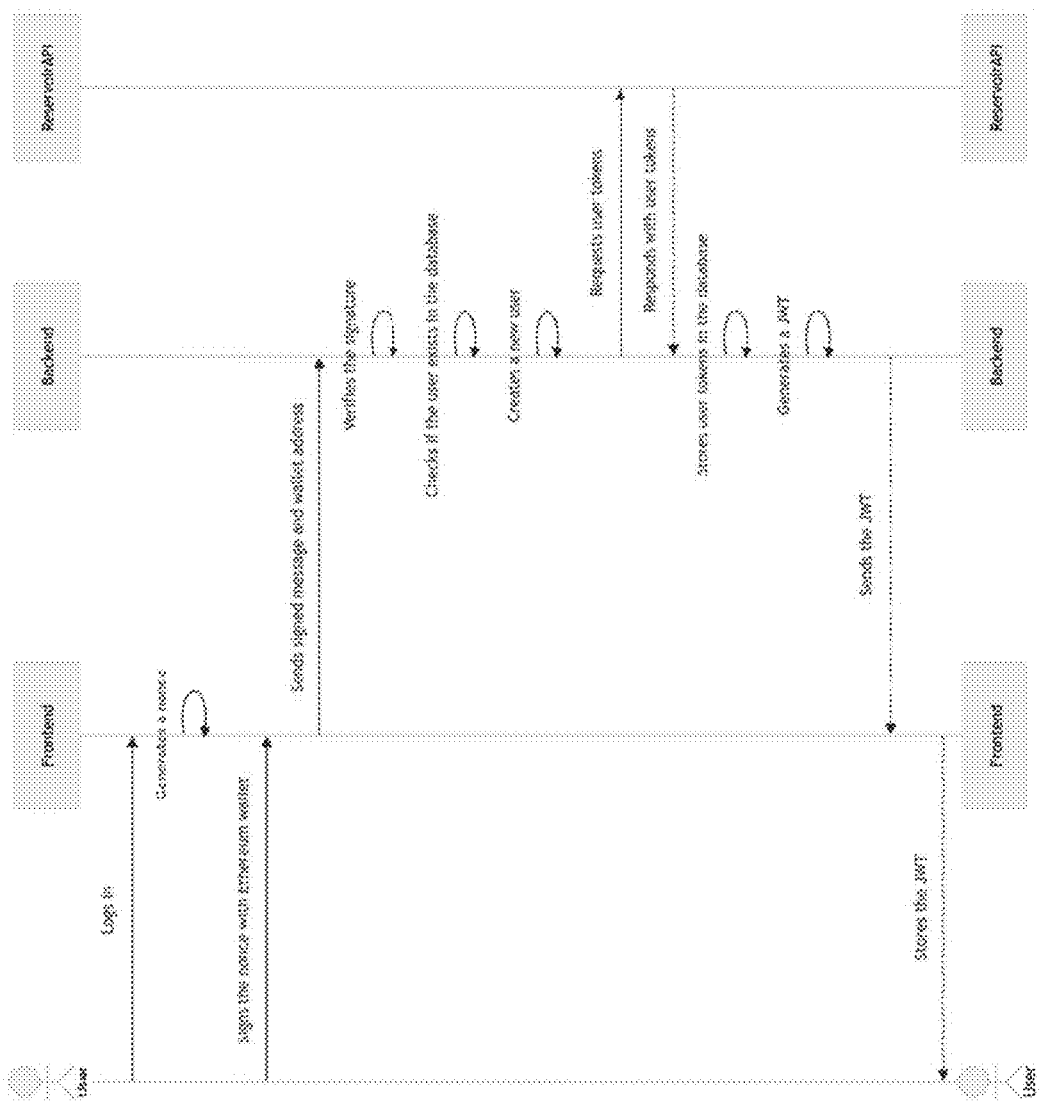
FIG. 6 shows a login sequence.
Figure 7:
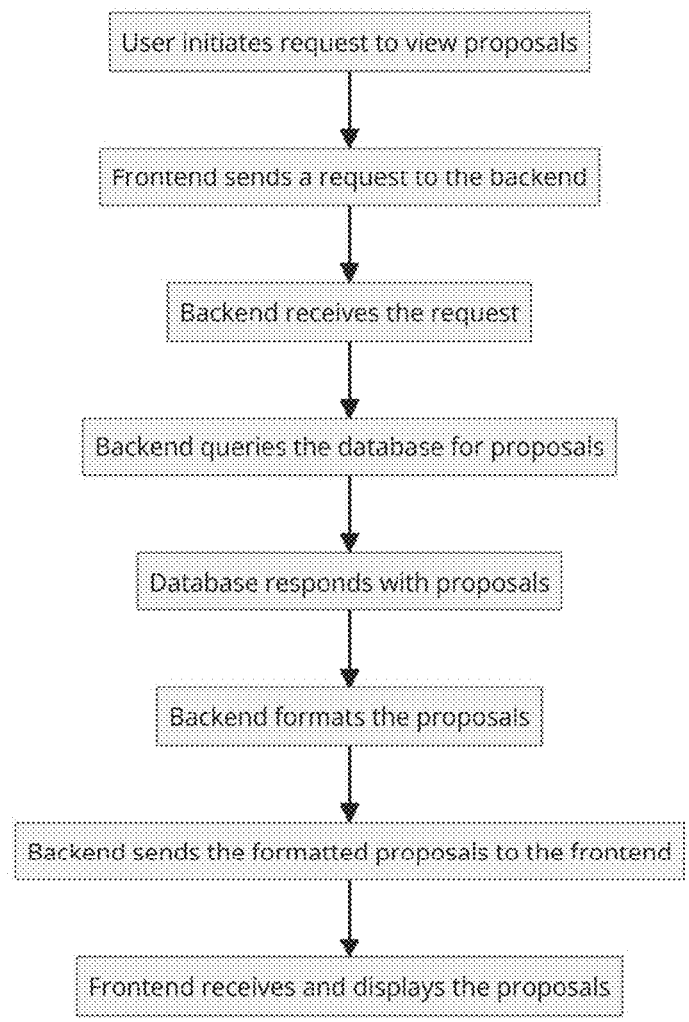
FIG. 7 shows a list proposal flowchart.
Figure 8:
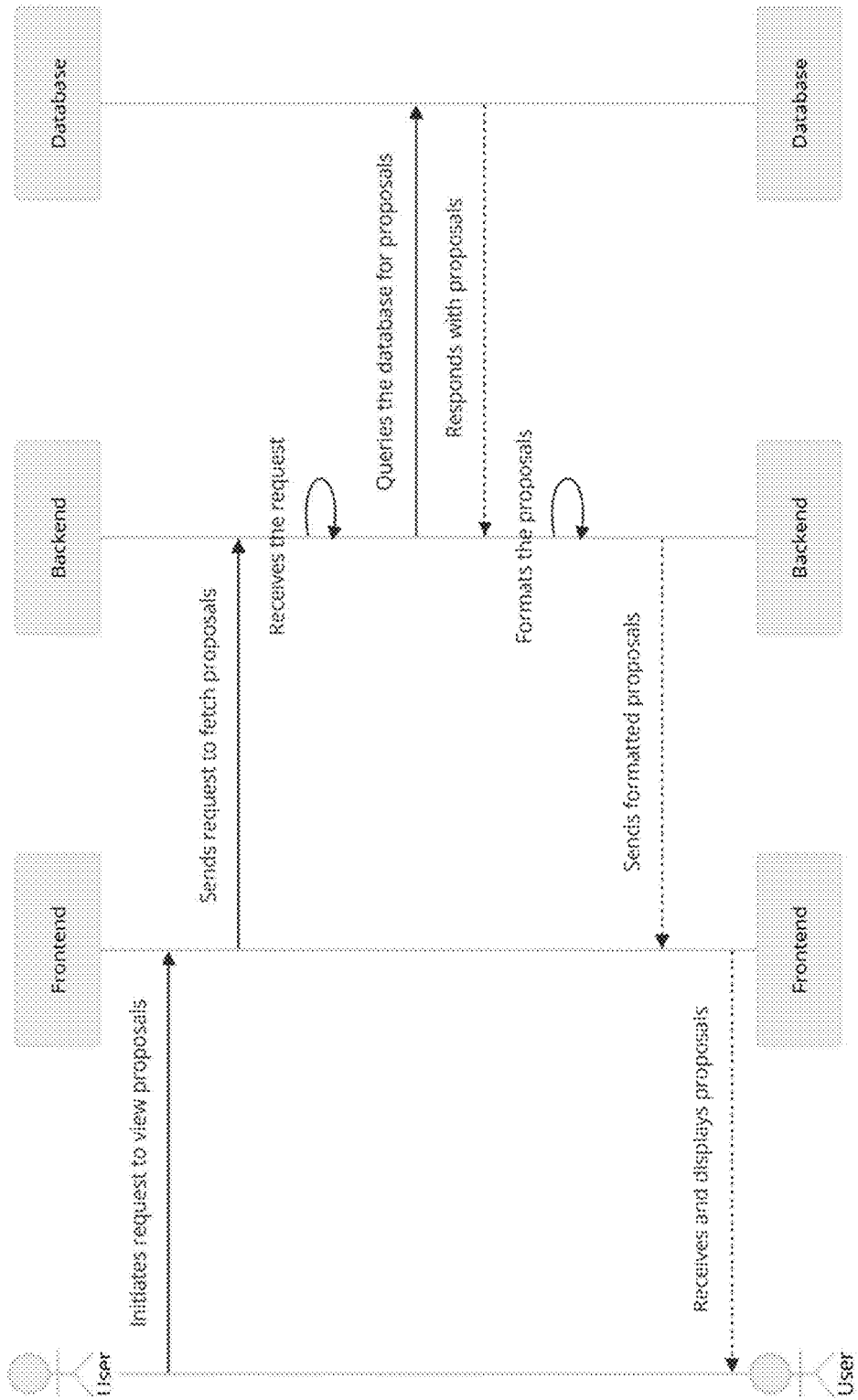
FIG. 8 shows a list proposal sequence.
Figure 9:
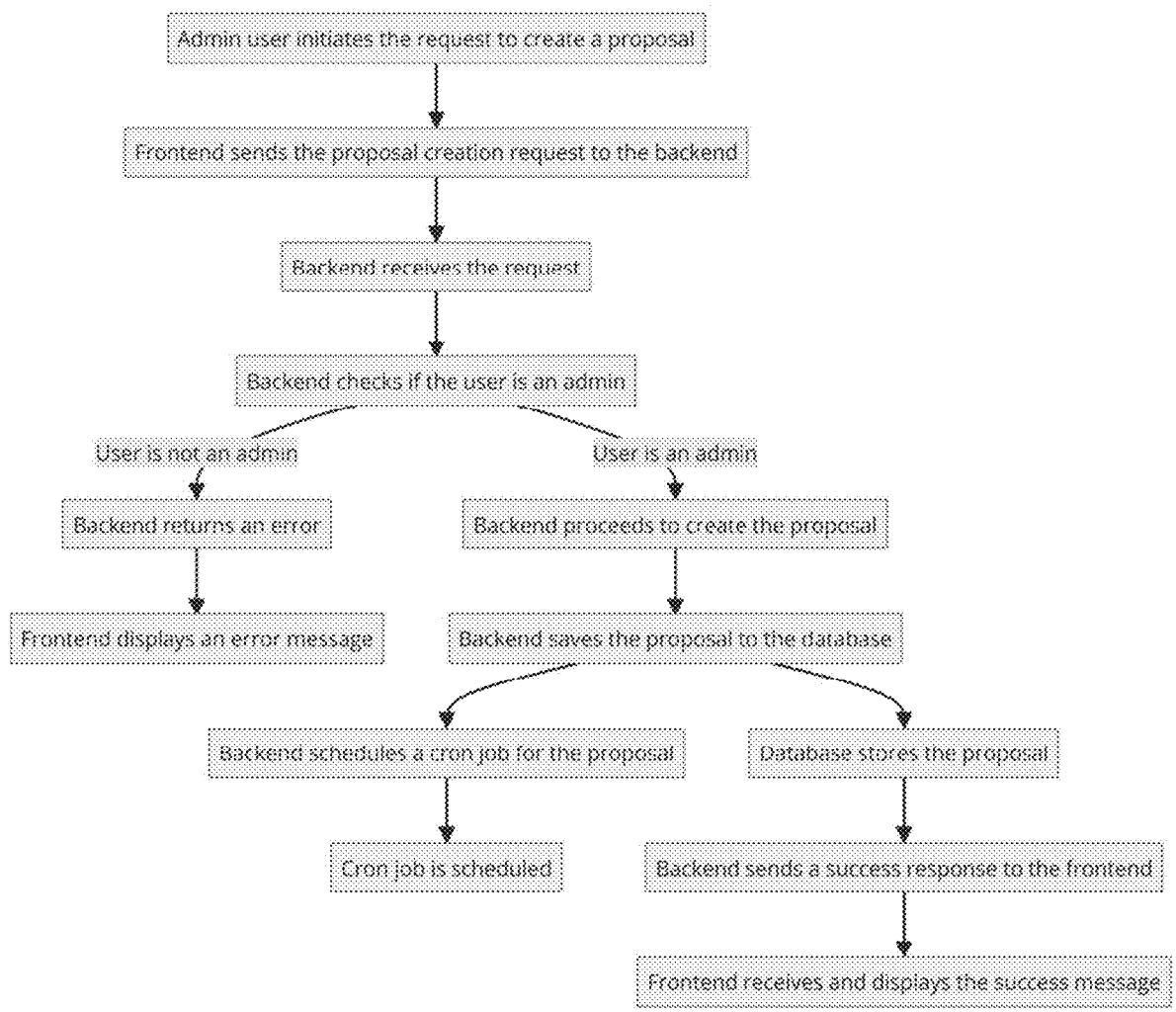
FIG. 9 shows a create a proposal flowchart.
Figure 10:
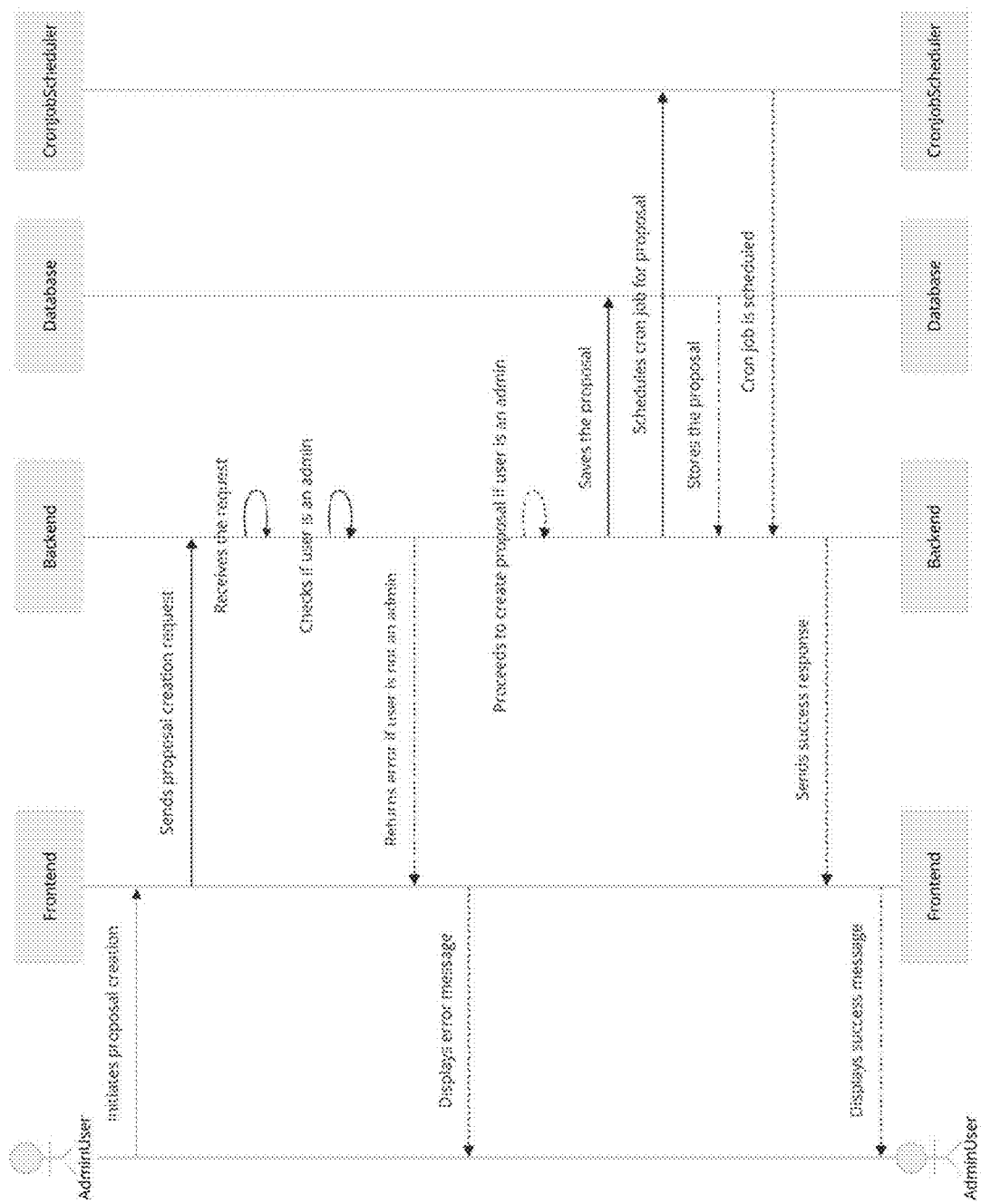
FIG. 10 shows a create a proposal sequence.
Figure 11:
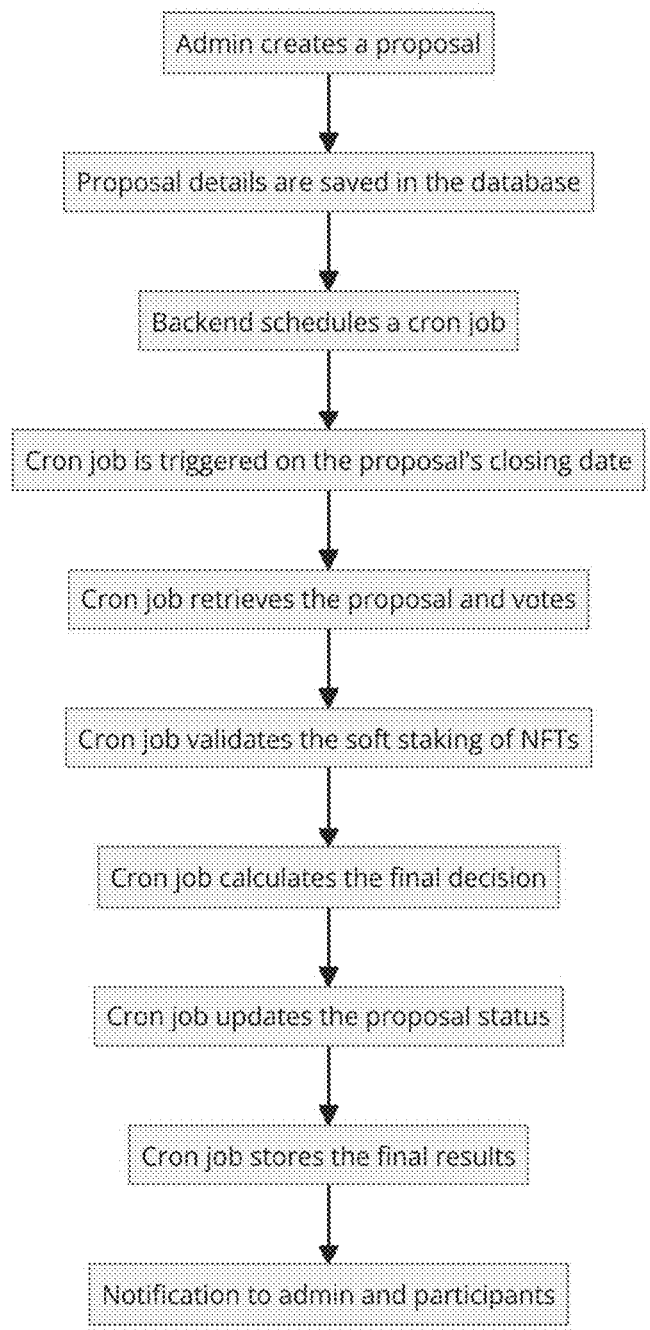
FIG. 11 shows a close proposal flowchart.
Figure 12:
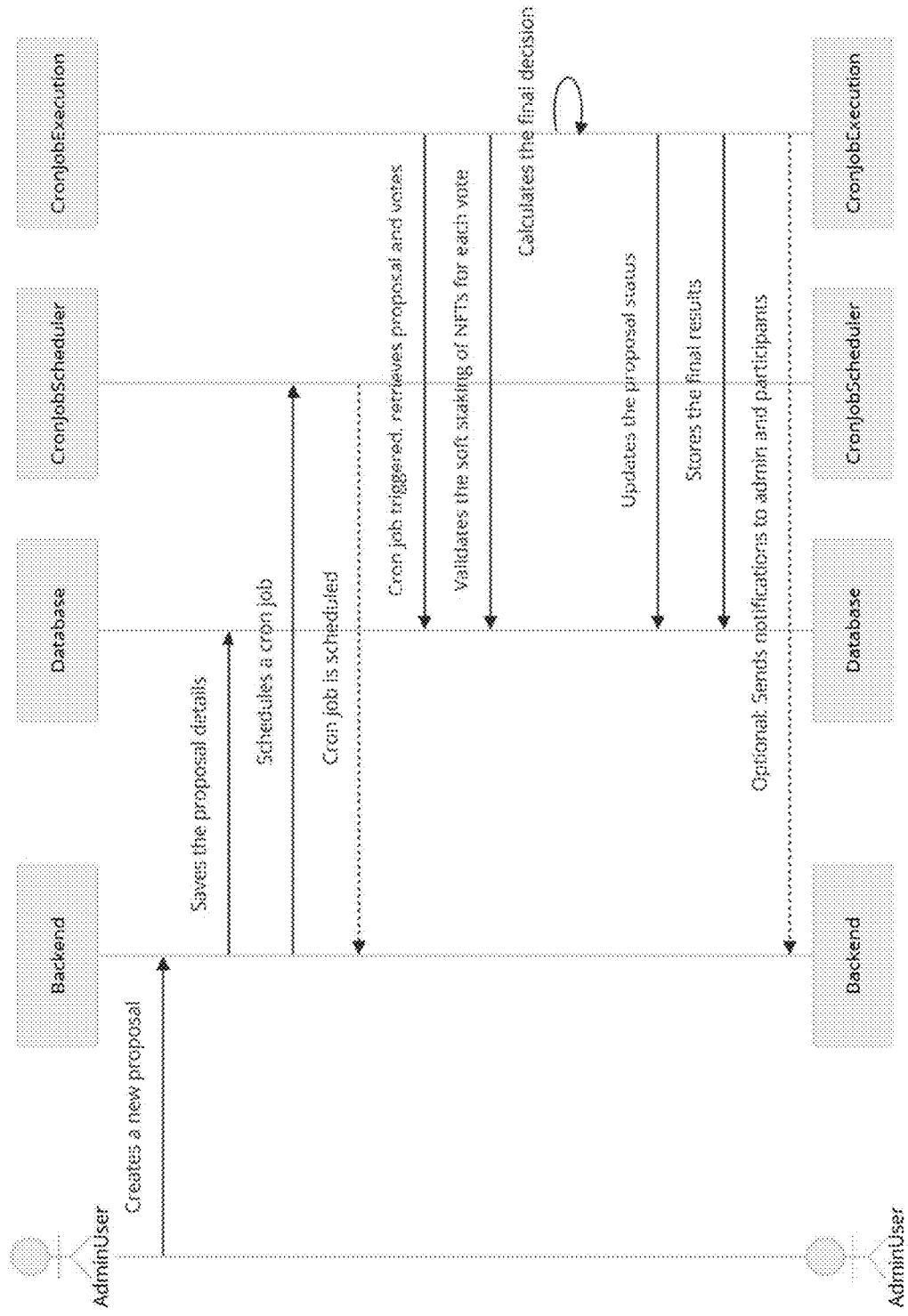
FIG. 12 shows a close proposal sequence.
Figure 13:
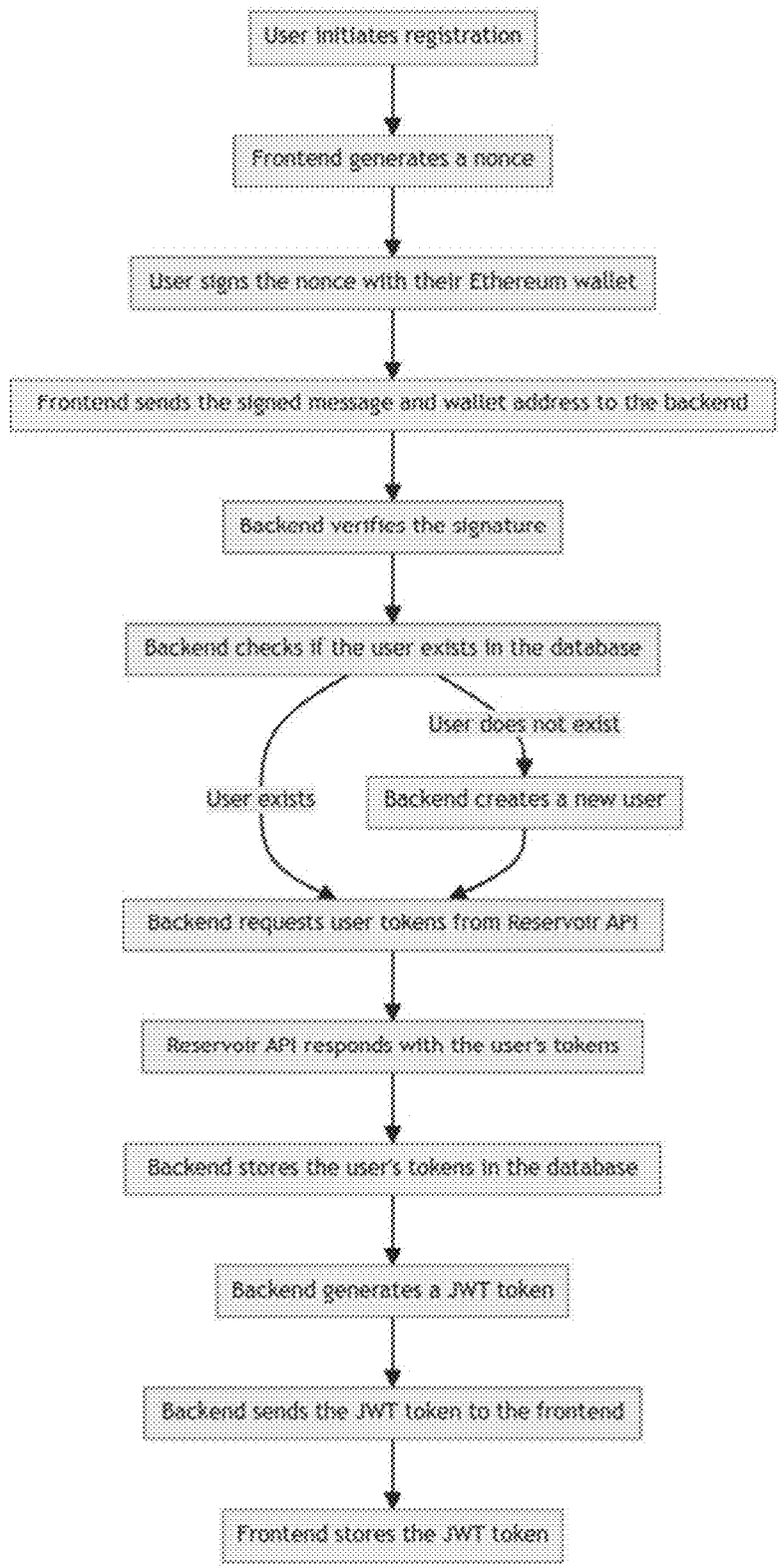
FIG. 13 shows a sign up flow chart.
Figure 14:
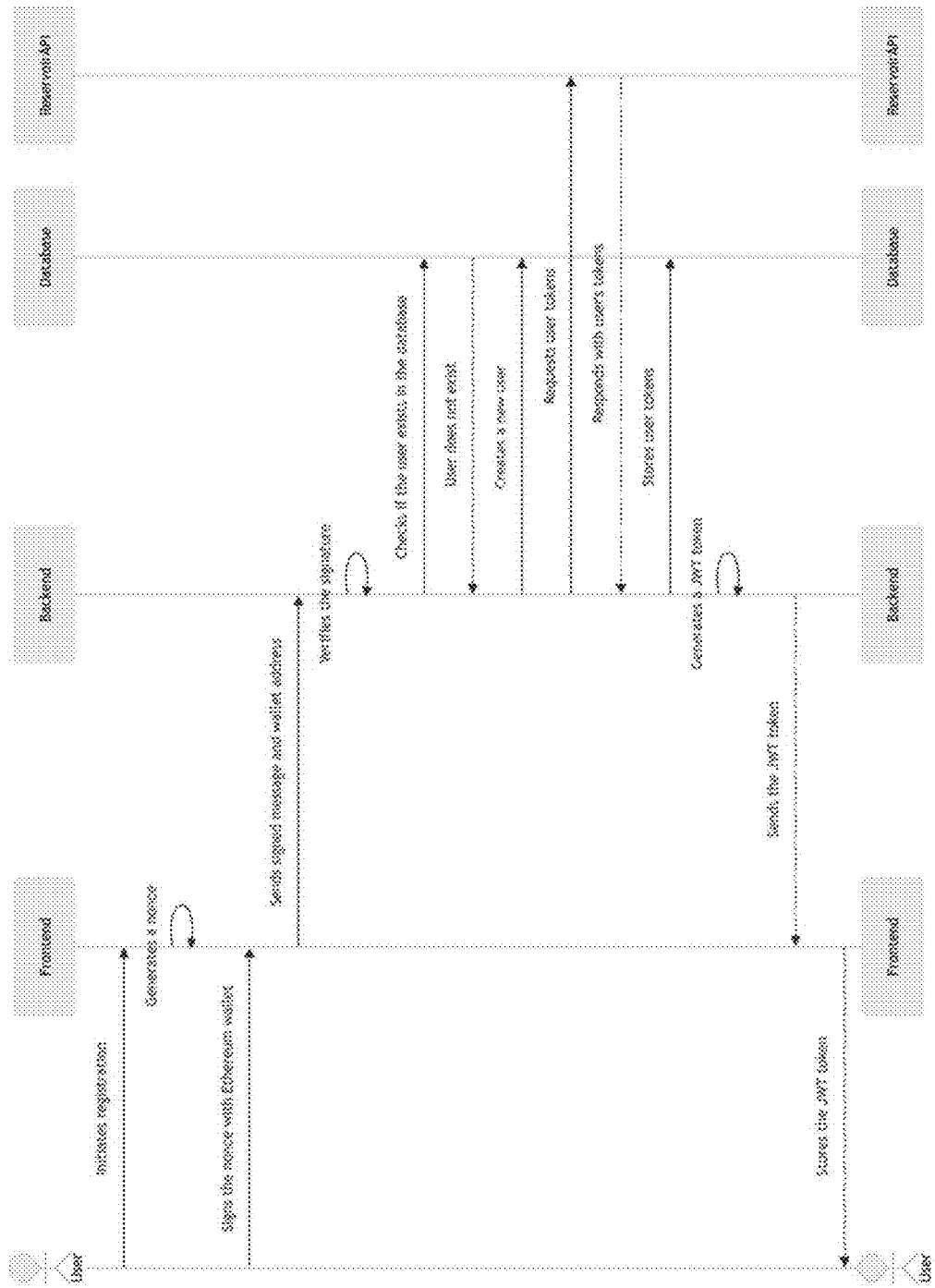
FIG. 14 shows a sign up sequence.
Figure 15:
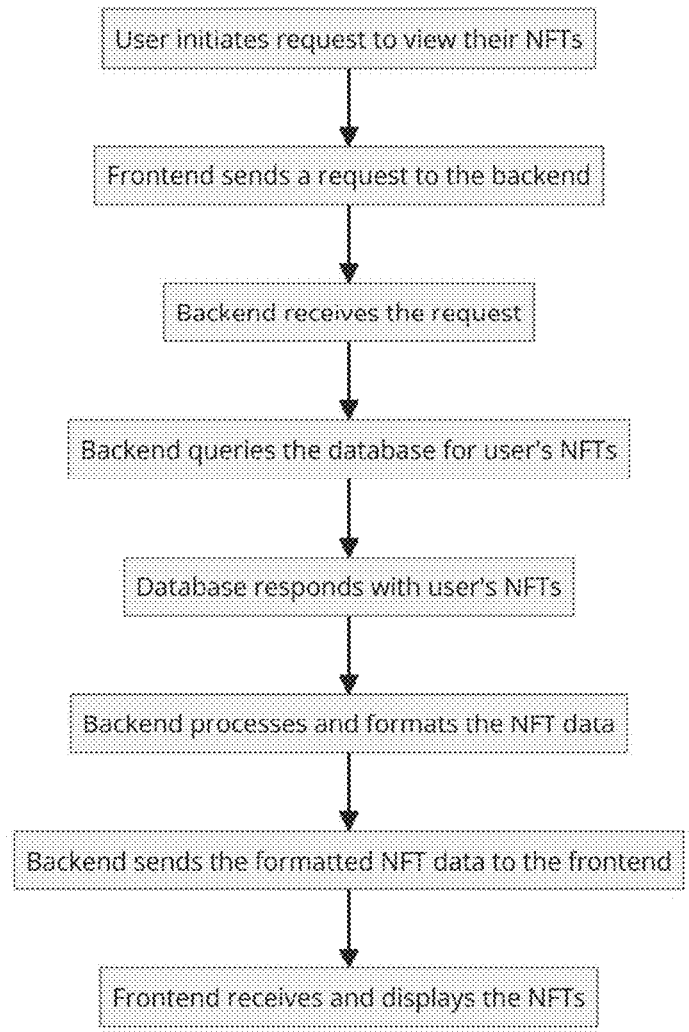
FIG. 15 shows a user NFT flow chart.
Figure 16:
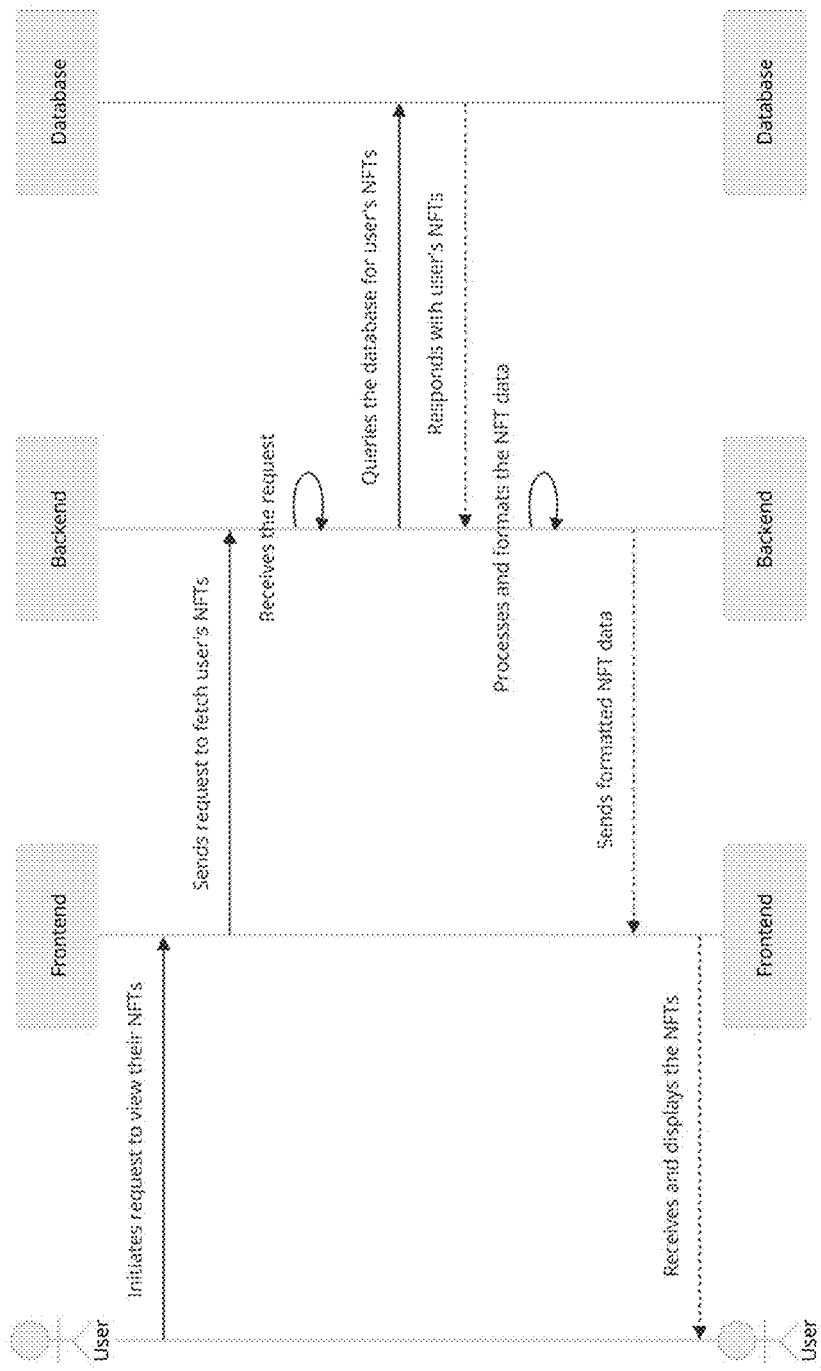
FIG. 16 shows a user NFT sequence.

FIGS. 3 and 4 show steps to view the members/users list.
FIGS. 5 and 6 show steps to login, verify, and obtain tokens.
FIGS. 7 and 8 show steps to request, receive, and display proposals.
FIGS. 9 and 10 show steps to create a proposal.
FIGS. 11 and 12 show steps to close a proposal, use votes, validates NFT's, calculate final decisions, store final decisions, and notify participants and administrators.
FIGS. 13 and 14 show steps to sign up, including initiating user registration, creating a new user, request and obtain and store tokens.
FIGS. 15 and 16 show steps to request and view tokens.

The PUNK Armada DAO is a "Decentralized Autonomous Organization" that incorporates software using a new voting model that includes soft staking of NFTs. DAO members utilize their PUNK Armada NFTs (an on-chain NFT collection) to allocate their voting power on various DAO proposals. Members can spread their voting power to multiple proposal options based on sentiment—another unique feature of the DAO blockchain software.

The "Punk Armada Stake API" is an advanced decentralized governance platform designed to facilitate the active participation of members in the PUNK Armada DAO. The platform integrates sophisticated web technologies with blockchain innovations in order to provide a robust environment for managing governance through proposals and for controlling digital assets in the form of NFTs.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. An improved governance system comprising:
   a plurality of computer systems incorporating blockchain software;
     wherein said plurality of computer systems are interconnected using wireless technology;
   non-fungible tokens;
     wherein said non-fungible tokens are generated by said plurality of computer systems; and
   an identity verification system;
     wherein said identity verification system incorporates and uses said non-fungible tokens to verify the identity of individuals using said governance system;
   wherein said individuals create accounts on said governance system, non-fungible tokens are generated per individual via said plurality of computer systems, their identities are verified via said non-fungible tokens, said non-fungible tokens are used by said individuals to create proposals within said plurality of computer systems, and wherein said proposals are used for governance voting procedures.

2. The improved governance system of claim 1, wherein said non-fungible tokens serve as governance tokens and are owned by said individuals and offer voting powers, wherein the more non-fungible tokens an individual obtains the stronger their voting power becomes.

3. The improved governance system of claim 1, wherein said non-fungible tokens are verified by checking an individual's signature against previous versions of that individual's signature obtained by said plurality of computer systems, and validating their identity.

4. The improved governance system of claim 1, wherein said blockchain software is adapted to provide soft staking to validate and prove ownership of an individual's non-fungible tokens.

5. The improved governance system of claim 4, wherein said governance voting procedures includes said validating and proving ownership of said individual's non-fungible tokens during voting procedures via said soft staking, thereby ensuring compliance of said voting procedures and prevents any manipulation of said individual's voting power.

6. The improved governance system of claim 5, wherein said blockchain software further includes penalties for misuse of said non-fungible tokens to protect said governance voting procedures.

7. The improved governance system of claim 5, wherein said governance voting procedures includes the steps of:
   an individual choosing a number of non-fungible tokens they have obtained for use in a governance voting procedure;
   the chosen non-fungible tokens are then validated via said soft staking;
   said individual then uses said chosen non-fungible tokens to vote; and
   said votes are stored in a database upon said plurality of computer systems for use in a chosen proposal for governance voting.

8. The improved governance system of claim 7, wherein said use of said governance voting system includes the steps of:
   creating an account;
   logging into said account;
   obtaining non-fungible tokens;
   creating a proposal;
   requesting, receiving, and displaying proposals;
   validating said non-fungible tokens; and
   using said non-fungible tokens for governance voting within a chosen proposal.

* * * * *